United States Patent [19]

Ward, Jr.

[11] Patent Number: 5,305,710
[45] Date of Patent: Apr. 26, 1994

[54] PET CARRIER MOUNTABLE ON BICYCLES AND THE LIKE

[76] Inventor: James F. Ward, Jr., 25 Pine Valley Rd., Floyd, Ga. 30161

[21] Appl. No.: 992,110

[22] Filed: Dec. 17, 1992

[51] Int. Cl.⁵ .............................. A61D 3/00
[52] U.S. Cl. ................... 119/771; 119/792; 119/756; 119/907; 280/304.5
[58] Field of Search ............ 119/101, 96, 103; 182/3, 4; 128/869, 874, 875; 224/39, 42.43; 280/304.5, 290, 288.4, 202; 482/23, 33, 34

[56] References Cited

U.S. PATENT DOCUMENTS

| | | | |
|---|---|---|---|
| 2,695,052 | 11/1954 | Yates et al. | 182/4 X |
| 3,330,258 | 7/1967 | Rosenberg | 119/103 |
| 3,379,439 | 4/1968 | Sorenson et al. | 182/3 X |
| 4,170,961 | 10/1979 | Rosenberg et al. | 119/103 |
| 4,693,212 | 9/1987 | Black | 119/103 |

Primary Examiner—Thomas Price
Attorney, Agent, or Firm—Vivian L. Steadman; Harry I. Leon

[57] ABSTRACT

A carrier with a harness and a platform having a plurality of releasable fasteners. The harness includes at least three sets of straps extendable around a dog's torso, with one of these strap sets being disposed proximate with the dog's neck and another with its hindquarters. Each releasable fastener is attachable to one of the strap sets proximate with the dog's underside and is anchored to one of a plurality of connectors which are spaced apart from each other and slideably tethered to the platform. Mountable on a bicycle, the platform is rigidly secured to, and supported in part by, the bicycle handlebars or, alternately, the bicycle seat post. The platform is further supported by at least one pair of frame members rigidly affixed thereto. The frame members of each such pair extend downwardly, straddling one of the spoked wheels of the bicycle, and are releasably secured to the bicycle frame proximate with the hub of the wheel they straddle. A leash connected to each of the strap sets of the harness allows a bicyclist to hoist an animal singlehandedly onto the platform while simultaneously stabilizing his bicycle. Perched on the platform and secured thereto by the harness, a pet can recline on the platform in a wide variety of orientations. Coupling between the harness and the platform is at once sufficiently restraining to prevent the pet's twisting into a position in which the pet is hanging by the harness from the platform and sufficiently flexible to allow the pet to shift its own body weight while the bicycle is in motion.

5 Claims, 3 Drawing Sheets

PET CARRIER MOUNTABLE ON BICYCLES AND THE LIKE

BACKGROUND OF THE INVENTION

1. Field of the Invention

This invention relates to the field of attachments for bicycles and the like which can be employed to restrain and transport dogs and other vertebrate animals.

2. Description of the Prior Art

Moorman, U.S. Pat. No. 4,597,359, discloses a platform which is supported by and above a seat of an automobile near its window level. A raised rim which surrounds the platform restrains a dog perched on the platform from sliding off of it during a quick stop or from crashing against the window when the car turns suddenly. Unfortunately, this raised rim also prevents the dog from relaxing with any of his limbs extending over the platform edges.

Bucket seats designed for use in cars or on bicylces offer occupants strapped in these seats even less opportunity to relax. Each such bucket seat is provided with straps to secure the occupant's torso firmly in place. More importantly, the occupant, when strapped in, must assume an upright, seated position, making a bucket seat unsuitable for carrying a dog or other four-legged creature.

SUMMARY OF THE INVENTION

The primary object of the present invention is to provide an apparatus including a platform and harness attachable thereto for restraining and transporting a pet such as a dog or cat on a bicycle while simultaneously allowing the pet to assume, during transport, a wide variety of comfortable resting or sitting positions.

A further object of the present invention is to provide an apparatus having means for hoisting, singlehandedly, a pet onto a platform, the hoisting means keeping the pet's torso disposed generally parallel with the ground, thereby eliminating any strain on the pet's vertebrae.

In accordance with the present invention, there is provided a bicycle-mounted carrier having a platform and hoisting means including a harness attachable to the platform. The platform is equipped with connecting means and with releasable fasteners spaced apart from each other and slideably engaged with the connecting means. Coupling between the fasteners and the harness is sufficiently flexible to allow a pet, secured to the platform by the harness, considerable freedom of motion. A pet restrained by the harness while it is anchored to the platform can, for example, shift from a position in which the pet is reclining on the platform diagonally with respect to the forward motion of the bicycle to one in which the pet is facing straight into the wind.

The harness comprises a pair of straps which, in use, extend longitudinally along the pet's backbone and belly, respectively, and at least three sets of straps interconnected with said pair of straps but extending generally perpendicularly thereto around the pet's torso. Means for releasably attaching one of the fasteners to each of the strap sets is provided. The sets of straps are spaced apart from each other, spanning substantially the length of the dog's backbone from neck to hindquarters.

The hoisting means further comprises a leash having a branched structure which has at least as many branches as there are sets of straps in the harness. The branched structure is attachable to the longitudinally extending strap connected to the strap sets and disposed proximate with the pet's backbone. When the branched structure is so attached, each branch supports one of the strap sets, so that when a pet's body is suspended in the harness, the weight of the body is spread substantially evenly along the length of the harness. In use, one person, utilizing the harness and leash in combination, can safely hoist the pet with one hand onto the platform while simultaneously steadying the bicycle with his other hand. Moreover, with this combination, the bicyclist can, without ever bending over, hoist the pet onto the platform, thus facilitating balancing the bicycle while simultaneously lifting the animal.

In the preferred embodiment, the carrier further comprises a skeletal framework and means for securing the framework to handlebars on the bicycle. The platform includes structural elements which are part of this skeletal framework and which define the periphery of at least one substantially horizontal cross-section of the framework, said periphery being of substantial length. Disposed generally horizontally and in front of the handlebars when secured thereto, the platform is further supported by a pair of frame members, which extend downwardly therefrom, straddling the front wheel of the bicycle. In use, opposite ends of each of the frame members are, respectively, rigidly affixed to the skeletal framework and releasably secured to the bicycle frame proximate with the hub of the front wheel.

In an alternate embodiment, the carrier further comprises means for securing the framework to the post of the bicycle handlebars. The framework of the carrier in this embodiment can alternately be secured to the post of the bicycle seat. Disposed generally horizontally when secured to the bicycle, the platform is further supported by two pairs of frame members, which extend downwardly therefrom, straddling one of the bicycle wheels. Opposite ends of each of the frame members are rigidly affixed to the framework and, in use, are releasably secured to the bicycle frame near the hub of the wheel which they straddle. Preferably, one frame member in each pair of frame members and a section of the framework extending between the respective frame members affixed to said section of the framework define, generally, an equilateral triangle in vertical outline, enhancing the strength of the carrier.

BRIEF DESCRIPTION OF THE DRAWINGS

Further details are explained below with the help of the examples illustrated in the attached drawings in which.

Like reference characters indicate corresponding parts throughout the several views of the drawings.

DESCRIPTION OF THE PREFERRED EMBODIMENTS

Figure 1:
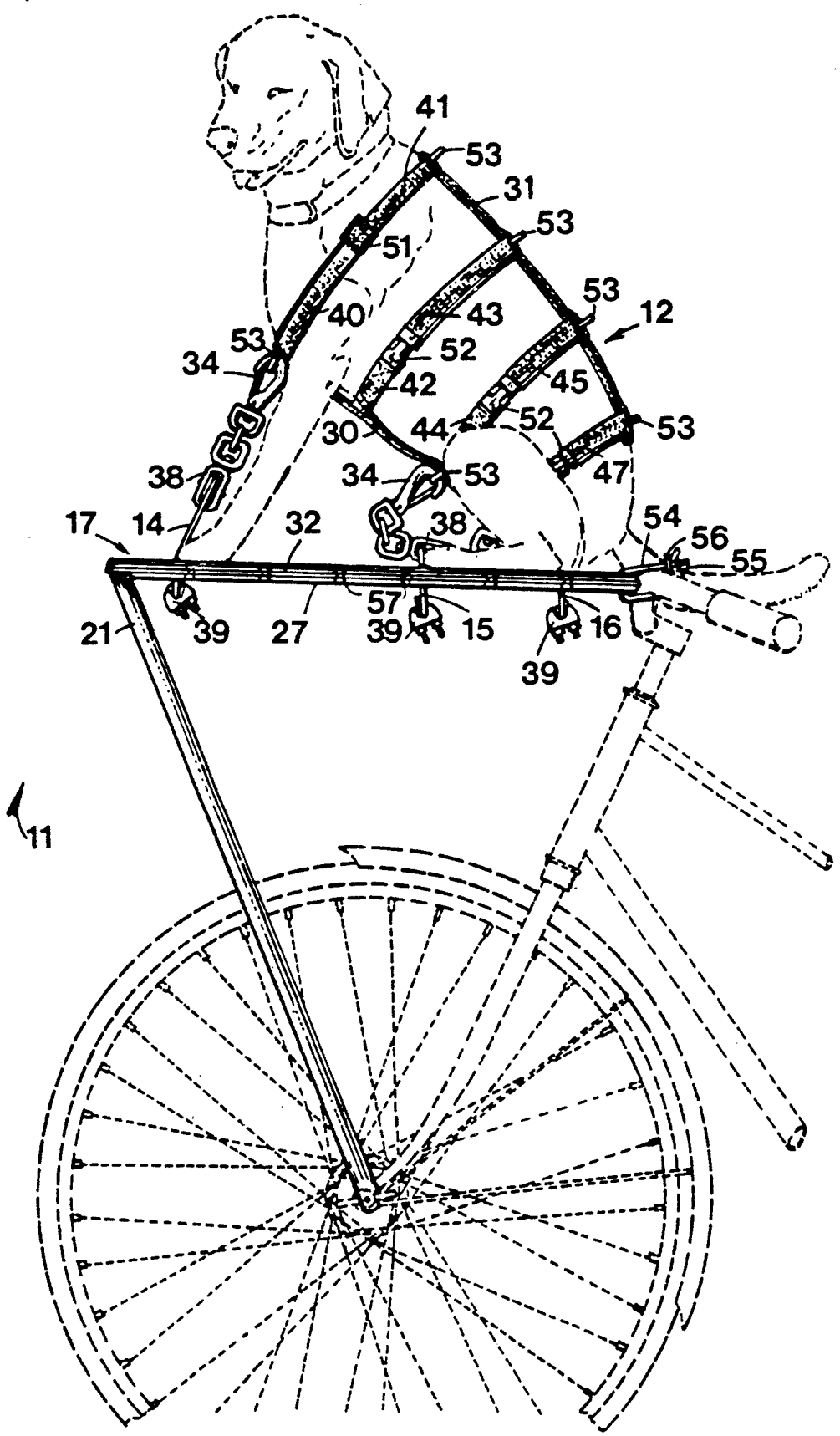
FIG. 1 is a side elevational view of one embodiment of the apparatus according to the present invention in which the carrier is shown mounted on the front of a bicycle and the harness is shown strapped to a dog, the leash having been detached from the harness.

In the drawings, an apparatus according to the present invention comprises a carrier 11, a harness 12, and a leash 13. The carrier 11 includes a skeletal framework 20 and a plurality of connecting means, such as guide cables 14, 15, and 16, which slideably engage fasteners 34. Slideably engaged fasteners 34 are releasably attachable to loops 53 on the harness 12 as are fasteners 34 connected to the leash 13.

Structural elements 23, 24, 25, 26, 27, 28 and 29 within the framework 20 support a skin 32 and, with the skin, form a platform 17. In addition, at least one pair of frame members 21, 22 rigidly attached to structural element 29 extend downwardly from the platform 17. The framework 20 is preferably fabricated from lightweight metal tubing, plastic or the like; the skin 32 from metal or plastic, which is extensively perforated. Material so perforated facilitates drainage, from the skin 32, of any water or other liquid which might otherwise accumulate there. In the embodiment illustrated in FIGS. 1-2, the skin 32 is formed from a chain-like stainless steel secured to the framework 20 by ties 57; and the structural elements 21, 22, 23, 24, 25, 26, 27, 28, and 29 comprise sections of metal tubing which measure, by way of example, $\frac{1}{2}$ inch in outer diameter. When formed of metal tubing, each structural element 21, 22, 23, 24, 25, 26, 27, 28, and 29, where it abuts another structural element, is preferably affixed thereto by welding.

In use, the platform 17 extends generally horizontally in front of the handlebars of a bicycle supported by the handlebars themselves and by frame members 21, 22 straddling the front wheel of the bicycle. Ends of the frame members 21, 22 distal from the platform 17 are secured to the bicycle frame proximate with the hub of the front wheel by wheel mounting means, such as wing nuts or the like, provided with the bicycle. Attachment of the platform 17 to the handlebars is achieved by securing structural element 28 thereto by clamping means such as a U-shaped bolt 54 and a plate 56. In the preferred embodiment, a pair of threaded end portions, defined by the bolt 54 and spaced apart from and disposed parallel to each other, is received by holes formed in the plate 56; and both the bolt and the plate are retained in assembled relation by wing nuts 55 threadedly engaged by the end portions.

The harness 12 comprises a pair of straps 30, 31 and at least four sets of straps 40, 41; 42, 43; 44, 45; 46, 47 attached by stitching or the like to said pair of straps. Extending generally perpendicularly to the straps 40, 41; 42, 43; 44, 45; 46, 47, the pair of straps 30, 31, in use, extend longitudinally along a pet's backbone and belly, respectively. As is best seen in FIG. 1, the sets of straps 40, 41; 42, 43; 44, 45; 46, 47 are spaced apart from each other, with each of the straps 41, 47 being disposed proximate with an end of the strap 31 and separated from each other by a distance substantially equal to the length of a dog's backbone from its neck to its hindquarters. Each of the strap sets 40, 41; and 42, 43; 44, 45; 46, 47 can be adjusted in length using keepers 51 and clasps 52, respectively, so that the harness fits snugly around a dog's torso. Means for releasably attaching the harness to the carrier 11 and to the leash 13 include loops 53 secured to both of the longitudinally extending straps 30, 31 proximate with their junctures with the strap sets.

Figure 2:
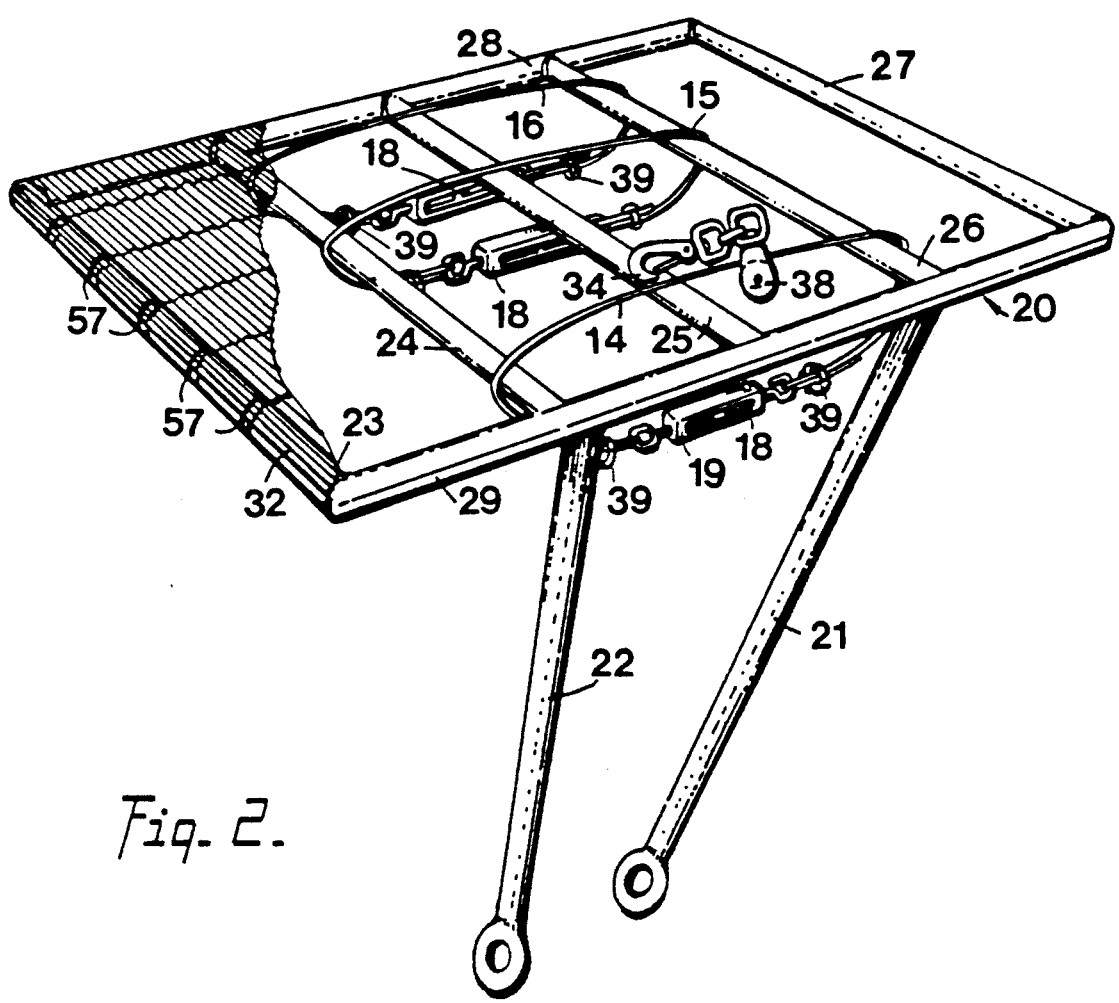
FIG. 2 is a front perspective view of the carrier in the embodiment according to FIG. 1, only a fragmentary portion of the skin of the carrier and only one of the releasable fasteners being shown for clarity of illustration.

As is best seen in FIG. 2, the guide cables 14, 15, 16 are looped around structural elements 24, 26, which are spaced apart from and aligned generally parallel to each other. Securing each cable 14, 15, 16 to the structural elements 24, 26 is a turnbuckle 18 connected to both ends of the cable by a pair of cable retainers 39. Within the turnbuckle 18, a link 19, which has opposite internal threads at each end thereof, can be turned to increase or decrease the effective length of the cable 14, 15, 16 connected to the turnbuckle. In use, the lengths of the cables 14, 15, 16 are adjusted to accommodate each individual pet on the basis of its size relative to that of the platform 17. For large dogs and other animals of similar size, the length of the guide cable 14, disposed proximate with the front edge of the platform 17, is preferably set so that the cable 14 is substantially greater in length than is the guide cable 16, disposed proximate with the rear edge of the platform. The length of the cable 15, on the other hand, is preferably set so that it lies between those of the cables 14, 16.

Slideably and rotatably tethered to each of the guide cables 14, 15, 16 by an assembly having a pulley 38 which can move along the guide cable is a fastener 34. Each fastener 34 is releasably attachable to one of loops 53 proximate with junctures between the strap sets 40, 41; 44, 45; 46, 47 and the strap 30. At least one of the fasteners 34, preferably the fastener attached to the guide cable 15, is constrained to stay well within the outer periphery of the platform 17, so that when the harness 12 is secured to the platform, a pet cannot twist its body into a position in which it is suspended by the harness over a peripheral edge of the platform. In the case of a large dog, the lengths of the cables 14, 15 and 16 may also need to be adjusted as described hereinabove; when they are suitably adjusted, such a dog, while having freedom to orient the front half of its body, is limited to sitting on the platform 17. Greater flexibility is allowable with smaller animals since there is less opportunity for a small animal to twist its body over the edge of the platform by utilizing slack in the cables 14, 15, 16 otherwise provided so that the animal can stand upright.

In an alternate embodiment, a platform has at least one recessed track (not shown) for movably tethering fasteners 34 attachable to the harness 12 proximate with the pet's chest and hindquarters. To allow the pet to turn around while standing on the platform without becoming twisted in connecting means linking the harness 12 and the platform, a platform having means, including a recessed track of substantially circular shape and a recessed swivel (not shown), for tethering fasteners 34 is provided.

Figure 3:
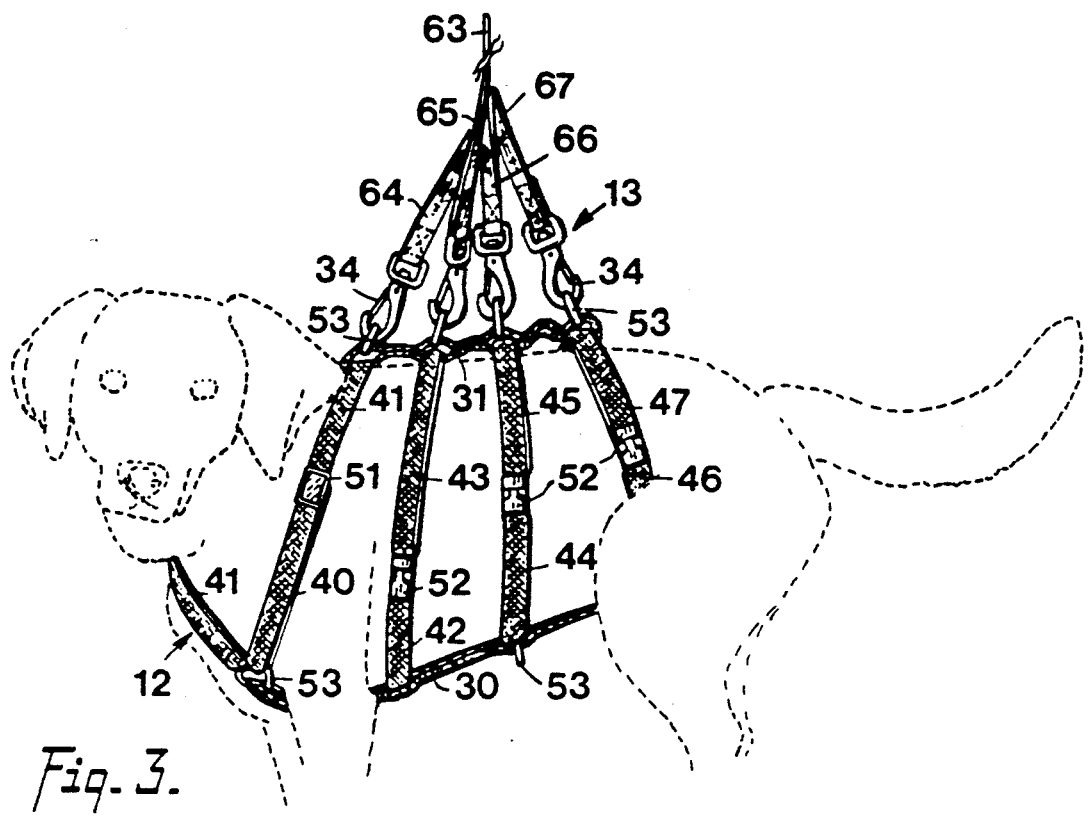
FIG. 3 is a side elevational view of the leash and of the harness in the embodiment according to FIG. 1, the harness being shown strapped to a dog and suspended by the leash.

The leash 13, which is employed, in combination with the harness 12, to hoist a pet from the ground to the platform 17, includes a branched structure which has at least as many branches 64, 65, 66, 67 as there are sets of straps in the harness 12. Branches 64, 65, 66, 67, which are of varying lengths, are attached to each other by stitching and, by releasable fasteners 34, to loops 53 connected to the harness 12 at the junctures between the strap 31 and the strap sets 40, 41; 42, 43; 44, 45; 46, 47. When a pet's body is suspended in the harness 12 by leash strap 63 as illustrated in FIG. 3, each branch 64, 65, 66, 67 supports the proximate strap set 40, 41; 42, 43; 44, 45; 46, 47, respectively, so that the weight of the pet's body is spread substantially evenly along the length of the harness. The lengths of the branches 64, 65, 66, 67 are chosen so that for a particular animal, its backbone remains generally parallel to the ground when the animal is being hoisted aloft. The harness 12 and the leash 13 in combination enable a person, with sufficient strength in one of his arms, to hoist a pet singlehandedly onto the platform 17 while simultaneously steadying the bicycle.

Figure 4:
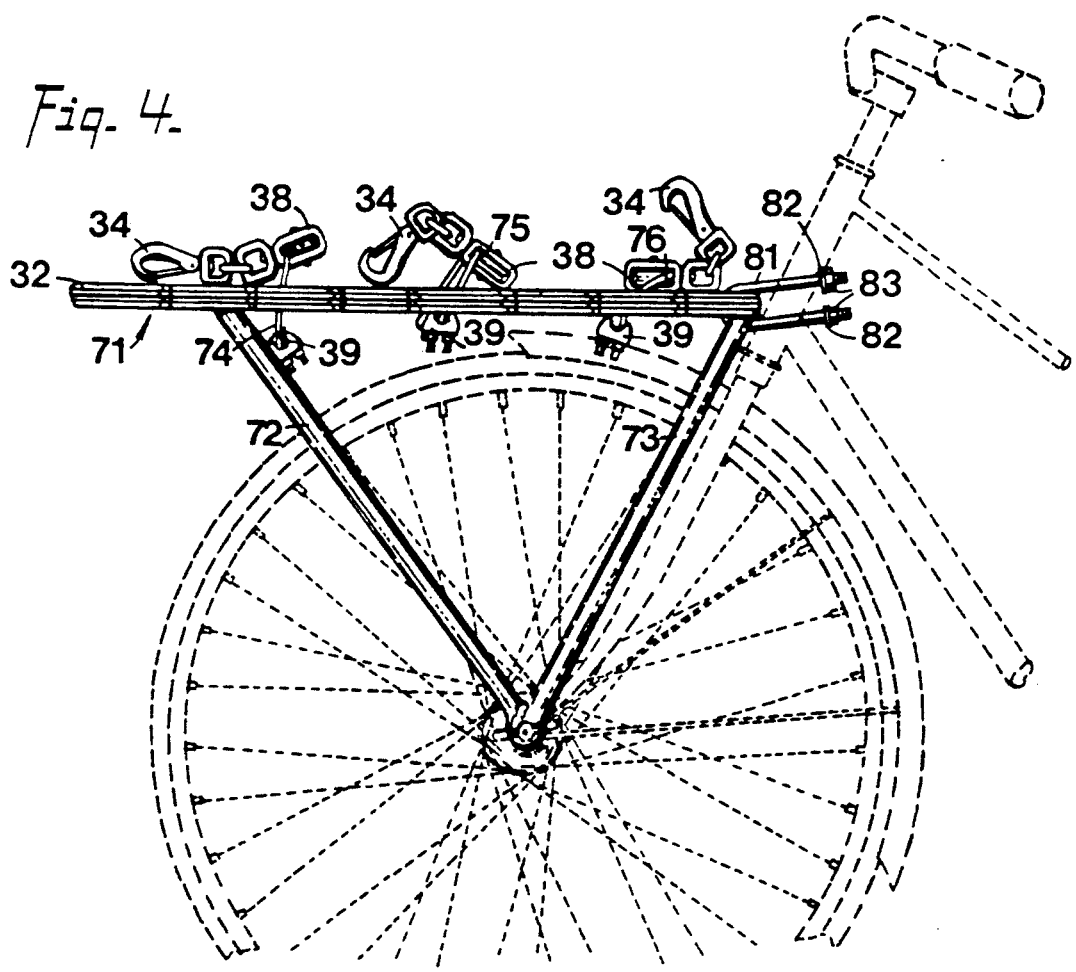
FIG. 4 is a side elevational view of an alternate embodiment of the apparatus according to the present invention in which the carrier is shown mounted on the front of a bicycle, the harness with the leash having been detached from the carrier.

In an alternate embodiment illustrated in FIG. 4, a carrier includes a generally horizontally disposed platform 71 supported by two pairs of downwardly extending frame members 72, 73. Guide cables 74, 75, 76 are looped around structural elements (not shown) which, similarly to the structural elements 24, 26, are spaced apart from and aligned generally parallel to each other. Securing each cable 74, 75, 76 to the structural elements is a turnbuckle, such as the turnbuckle 18 shown in FIG. 2, which is connected to both ends of the cable by a pair of cable retainers 39. On each side of the bicycle wheel, frame members 72, 73 and a horizontally extending structural element (not shown) within the structural framework of the platform 71 define an approximately equilateral triangle in vertical outline, enhancing the strength of the carrier. Pairs of frame members 72, 73 straddle one of the wheels of the bicycle. When the platform 71 is secured to the post of the handlebars (or, alternately, to the post of the seat), ends of the frame members 72, 73 distal from the platform 71 are secured to the bicycle frame proximate with the hub of the front wheel (or, alternately, the rear wheel) by wheel mounting means provided with the bicycle. Attachment of the platform 71 to the post of the handlebars (or of the seat) is achieved by clamping means such as a pair of U-shaped bolts 81 with threaded end portions and a pair of plates 82. In the preferred embodiment, each of the end portions, defined by the bolts 81, is received by a hole formed in one of the plates 82; and both the bolts and the plates are retained in assembled relation by two pairs of nuts 83 threadedly engaged by the end portions.

What is claimed is:

1. An apparatus adapted for transporting a pet, which comprises:
   (a) a platform having an outer periphery;
   (b) hoisting means including a harness and a leash, the harness having first and second straps which are adapted to extend longitudinally along the pet's torso and at least three sets of straps interconnected with said first and second straps but extending generally perpendicularly thereto, the leash having a branched structure which has at least as many branches as there are sets of straps, each branch being attachable to the first strap proximate with points where the first strap is interconnected with one of the sets of straps;
   (c) a plurality of fasteners attachable to the harness; and
   (d) means for tethering each fastener to the platform, tethering means for at least two fasteners being slideably connected to the platform, the tethering means limiting the travel of each of the fasteners, at least one of the fasteners being further constrained by the tethering means to stay well within the outer periphery of the platform, so that the pet can safely enjoy substantial freedom of motion while riding on the platform.

2. An apparatus adapted for transporting a pet, which comprises:
   (a) a platform;
   (b) hoisting means including a harness, the harness having an upper strap adapted to extend longitudinally along the pet's backbone and at least three sets of straps interconnected with said upper strap but extending generally perpendicularly thereto, the hoisting means further comprising a branched structure, the branched structure being attached, in use, to the upper strap proximate with each interconnection between the upper strap and the sets of straps;
   (c) a plurality of fasteners attachable to the harness; and
   (d) means for tethering each fastener to the platform, the tethering means limiting the travel of each of the fasteners, so that the pet can safely enjoy substantial freedom of motion while riding on the platform.

3. The apparatus according to claim 2 which further comprises a lower strap which is adapted to extend longitudinally along the pet's belly, the three sets of straps being interconnected with said lower strap.

4. The apparatus according to claim 2 wherein the branched structure defines at least as many branches as there are sets of straps, each branch being attachable to the upper strap proximate with points where the upper strap is interconnected with one of the sets of straps.

5. An apparatus adapted for transporting a pet, which comprises:
   (a) a platform;
   (b) hoisting means including a harness, the hoisting means, in use, supporting the pet's body so that when the pet's body is suspended in the harness, the weight of the body is spread substantially evenly along the length of the harness;
   (c) at least one fastener attachable to the harness; and
   (d) means for tethering the fastener to the platform, the tethering means limiting the travel of the fastener, so that the pet can safely enjoy substantial freedom of motion while riding on the platform.

* * * * *